United States Patent
Poss et al.

(10) Patent No.: US 11,735,210 B2
(45) Date of Patent: Aug. 22, 2023

(54) PREAMPLIFIER WITH READ/WRITE POWER CHANNELS

(71) Applicant: Western Digital Technologies, Inc., San Jose, CA (US)

(72) Inventors: Joey M. Poss, Rochester, MN (US); Erhard Schreck, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/557,528

(22) Filed: Dec. 21, 2021

(65) Prior Publication Data

US 2023/0197108 A1    Jun. 22, 2023

(51) Int. Cl.
 *G11B 5/09*  (2006.01)
 *G11B 5/02*  (2006.01)
 *G11B 5/027* (2006.01)

(52) U.S. Cl.
 CPC .................... *G11B 5/027* (2013.01)

(58) Field of Classification Search
 CPC ..... G11B 5/035; G11B 27/36; G11B 20/0013; G11B 5/54; G11B 5/59633; G11B 5/59638; G11B 5/09; G11B 5/02; G11B 20/10027
 USPC ......................................... 360/69, 75, 31, 67
 See application file for complete search history.

(56) References Cited

U.S. PATENT DOCUMENTS

| | | | |
|---|---|---|---|
| 6,424,476 B1 | 7/2002 | Matsubara et al. | |
| 7,479,713 B2 | 1/2009 | Tanner | |
| 7,599,141 B2 * | 10/2009 | Okamura | G11B 19/14 360/69 |
| 3,102,614 A1 | 1/2012 | Song et al. | |
| 8,766,707 B1 | 7/2014 | Younger et al. | |
| 2007/0279790 A1 | 12/2007 | Tanner | |
| 2009/0244758 A1 | 10/2009 | Bloodworth et al. | |

OTHER PUBLICATIONS

Burger, "Preamplifier and read-channel design addresses hard-drive goals," EDN, Dec. 3, 2009, retrieved from https://www.edn.com/preamplifier-and-read-channel-design-addresses-hard-drive-goals/ on Aug. 27, 2021, 5 pgs.

(Continued)

*Primary Examiner* — Nabil Z Hindi
(74) *Attorney, Agent, or Firm* — Patent Law Works, LLP

(57) ABSTRACT

Example preamplifier circuits, data storage devices, and methods to provide a preamplifier circuit with separate read and write power channels are described. The preamplifier circuit may include a write driver circuit configured to send a write signal to a writer element of a data storage device and a read driver circuit configured to receive a read signal from a reader element of the data storage device. The write driver circuit may receive a write power signal through a write power channel of a bus interface and the read driver circuit may receive a read power signal through a read power channel of the bus interface, where the write power signal and the read power signal are different. In some configurations, the different read and write power signals may be received from a switching regulator on the printed circuit board that mounts other data storage device electronics, such as the drive controller circuit and/or read/write channel circuit.

20 Claims, 5 Drawing Sheets

(56) References Cited

OTHER PUBLICATIONS

Chatradhi, "Hard Drive for Low Power Energy Efficiency in Disk Storage," Hitachi Global Storage Technologies, presentation, Jun. 2009, 24 pgs.

Electronic Products, "LSI Next Generation Preamplifier IC Boosts Performance While Reducing Power Consumption by 30 Percent," Electronic Products, Jun. 12, 2008, retrieved from https://www.electronicproducts.com/lsi-next-generation-preamplifier-ic-boosts-performance-while-reducing-power-consumption-by-30-percent/# on Aug. 27, 2021, 5 pgs.

Marvell, "Hard Disk Drives (HDD) Solutions | Delivering High-Capacity Cloud and Edge Data Storage," retrieved from https://www.marvell.com/products/hdd.html on Aug. 27, 2021, 4 pgs.

Oshea, "Preamplifier chip spun for low-power 2.5-inch hard disk drive market," EE Times, Aug. 10, 2004, retrieved from https://www.eetimes.eom/preamplifier-chip-spun-for-low-power-2-5-inch-hard-disk-drive-market/# on Aug. 27, 2021, 3 pgs.

Seaga Ie Technology Llc, "Reducing Storage Energy Consumption by up to 75%," Seagate Technology LLC technology white paper, Mar. 2011, 13 pgs.

* cited by examiner

PREAMPLIFIER WITH READ/WRITE POWER CHANNELS

TECHNICAL FIELD

The present disclosure relates to preamplifier circuits for data storage devices. In particular, the present disclosure relates to read/write power supply to the preamplifier circuit.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track. The magnetic disk acts as a non-volatile storage medium for storing data.

FIG. 1 shows a prior art disk format 2 as comprising a number of servo tracks 4 defined by servo sectors $6_0$-$6_N$ recorded around the circumference of each servo track. In some configurations, each servo sector comprises a preamble for storing a periodic pattern, which allows proper gain adjustment and timing synchronization of the read signal, and a sync mark for storing a special pattern used to symbol synchronize to a servo data field. The servo data field stores coarse head positioning information, such as a servo track address, used to position the head over a target data track during a seek operation. Each servo sector $6_i$ further comprises groups of servo bursts (e.g., N and Q servo bursts), which are recorded with a predetermined phase relative to one another and relative to the servo track centerlines. The phase-based servo bursts provide fine head position information used for centerline tracking while accessing a data track during write/read operations.

FIG. 2 shows a prior art mechanical configuration for a hard disk drive (HDD) 200 comprising a spindle 202 that holds a plurality of platters 204. Each platter 204 has at least one magnetic surface 206, such as a magnetic surface formatted similarly to disk format 2 in FIG. 1. Magnetic surface 206 may be configured to have digitally encoded data stored thereon as magnetized domains. A head 208 may be mounted at the end of an arm 210 controlled by an actuator 212. A read element 214 may be configured to detect magnetized portions of magnetic surface 206 and generate an analog read signal. A write element 216 may be configured to generate a timed write field to write (or erase) magnetized portions of magnetic surface 206 using an analog write signal. In some configurations, head 208 may include more than one read element 214 and/or write element 216 and HDD 200 may include multiple heads 208, arms 210, and/or actuators 212. A preamplifier (preamp or preamplifier circuit) 218 controls the read and write signals to the corresponding read and write elements (e.g., read element 214 and write element 216) of each head (e.g., head 208). For example, preamplifier 218 may include a plurality of write driver circuits and read driver circuits corresponding to each head and their respective read elements and write elements. Preamplifier 218 may be configured to condition the write signal to the write elements for a desired write voltage and may use a different read voltage for the read elements. Preamplifier 218 may be attached to a flex circuit 220 that provides a data and power bus connection to a printed circuit board (not shown) with other drive control circuitry, such as a disk drive controller, through a flex interface connector 222.

In some preamplifier configurations, a single power source or signal is provided to the preamplifier circuit, generally corresponding to the higher write voltage, and a linear read regulator on the preamplifier chip reduces the source voltage to the desired read voltage. However, this linear read regulator may waste energy, generate excess heat, and increase the complexity of the preamplifier circuit.

There is a need for technology that reduces the power used by the preamplifier circuit and the data storage device as a whole.

SUMMARY

Various aspects for a preamplifier circuit with separate read and write power channels are described, particularly power channels that take advantage of more efficient switching regulators on the data storage device printed circuit board (PCB).

One general aspect includes a preamplifier circuit that includes at least one write driver circuit configured to send a write signal to at least one head of a data storage device; at least one read driver circuit configured to receive a read signal from the at least one head of the data storage device; and a bus interface. The bus interface includes a write power interface configured to receive a write power signal for the at least one write driver circuit and a read power interface configured to receive a read power signal for the at least one read driver circuit, where a write voltage of the write power signal is different than a read voltage of the read power signal.

Implementations may include one or more of the following features. The at least one write driver circuit may include: a write data receiver configured to receive a write data signal from a read/write channel of the data storage device; and at least one write driver amplifier configured to amplify the write data signal using the write power signal. The at least one read driver circuit may include: a read signal circuit configured to send, using the read power signal, a baseline signal to the at least one head and receive the read signal from the at least one head; and a read driver amplifier configured to send the read signal to the read/write channel. The at least one head may include a plurality of writer elements and the at least one write driver circuit may further include: a plurality of write driver amplifiers corresponding to the plurality of writer elements and configured to receive the write power signal; and a write multiplexer configured to separate the write data signal into a plurality of component write data signals corresponding to the plurality of writer elements and send the component write data signals to the plurality of write driver amplifiers. The at least one head may include a plurality of reader elements and the at least one read driver circuit may further include: a plurality of read signal circuits corresponding to the plurality of reader elements and configured to receive the read power signal; and a read multiplexer configured to combine a plurality of component read signals corresponding to the plurality of reader elements into the read signal sent to the read driver amplifier. The at least one write driver amplifier may be further configured to receive a source write voltage for the write power signal and return a sink write voltage for the write power signal, where the source write voltage and the sink write voltage are asymmetrical. The read signal circuit may be further configured to receive a source read voltage for the read power signal and return a sink read voltage for the read power signal, where the source read voltage and the sink read voltage are symmetrical. The bus interface further may include: at least one write data interface configured to receive at least one write data signal from the read/write channel; and at least one read data interface configured to return at least one read signal to the read/write channel. The bus interface may electrically connects: the at least one write driver circuit to a first voltage source on a power circuit of the data storage device; and the at least one read driver circuit to a second voltage source on the power circuit of the data storage device, where the second voltage source is a switching regulator of the power circuit. The first voltage source may be a first converter of the switching regulator; the second voltage source may be a second converter of the switching regulator; the switching regulator may receive a source voltage from a power source of the data storage device; and the power circuit may be connected to a printed circuit board that includes a read/write channel for the data storage device. A data storage device may include the preamplifier circuit.

Another general aspect includes a method that includes: receiving, by a preamplifier circuit and from a power circuit, a write power signal for a write driver circuit in the preamplifier circuit; receiving, by the preamplifier circuit and from the power circuit, a read power signal for a read driver circuit in the preamplifier circuit, where a write voltage of the write power signal is different than a read voltage of the read power signal; sending, from the write driver circuit and using the write power signal, a write signal to at least one writer element of a data storage device; receiving, by the read driver circuit and using the read power signal, a read signal from at least one reader element of the data storage device; and sending, by the read driver circuit, the read signal to a read/write channel of the data storage device.

Implementations may include one or more of the following features. The method may include: receiving, by the write driver circuit, a write data signal from a read/write channel of the data storage device; amplifying, by the write driver circuit, the write data signal using the write power signal; and sending, by the read driver circuit and using the read power signal, a baseline signal to the at least one reader element, where the read signal from the at least one reader element is responsive to the baseline signal. The method may include: separating, by the write driver circuit, the write data signal into a plurality of component write data signals corresponding to a plurality of writer elements; and amplifying, by the write driver circuit, the plurality of component write data signals using the write power signal. The method may include: sending, by the read driver circuit, a plurality of baseline signals based on the read power signal to a plurality of reader elements; receiving, by the read driver circuit, a plurality of component read signals corresponding to the plurality of reader elements; and combining, by the read driver circuit, the plurality of component read signals into the read signal sent to the read/write channel. The method may include: receiving, by the write driver circuit, a source write voltage for the write power signal; and returning, by the write driver circuit, a sink write voltage for the write power signal, where the source write voltage and the sink write voltage are asymmetrical. The method may include: receiving, by the read driver circuit, a source read voltage for the read power signal; and returning, by the read driver circuit, a sink read voltage for the read power signal, where the source read voltage and the sink read voltage are symmetrical. The preamplifier circuit may receive, through a bus interface of the preamplifier circuit, the write power signal from a first voltage source, the write data signal, and the read power signal from a second voltage source, and may return, through the bus interface, the read signal to the read/write channel. The method may include: receiving, at a switching regulator electrically connected to the preamplifier circuit, a source power signal having a source voltage; and converting, by the switching regulator, the source power signal to the read power signal, where the source voltage is different than the read voltage. The method may include switching, by the switching regulator, between sending the write power signal to the write driver circuit and sending the read power signal to the read driver circuit.

Still another general aspect includes a data storage device that includes a non-volatile storage medium, a read/write channel circuit, and a preamplifier circuit that includes: a write driver circuit configured to send a write signal to a writer element for the non-volatile storage medium; a read driver circuit configured to receive a read signal from a reader element for the non-volatile storage medium; means for receiving a write power signal for the write driver circuit; and means for receiving a read power signal for the read driver circuit, where a write voltage of the write power signal is different than a read voltage of the read power signal. The device also includes means for converting a source power signal to the read power signal, where a source The present disclosure describes various aspects of innovative technology capable of reducing energy use, heat, and system complexity in data storage devices using a preamplifier circuit. The various embodiments include operations and control circuitry to overcome or at least reduce issues previously encountered in data storage devices and, accordingly, are more efficient, reliable, and/or cost-effective than other data storage devices. That is, the various embodiments disclosed herein include hardware and/or software with functionality to improve data storage device energy consumption, such as by using separate read power and write power inputs to the preamplifier circuit to utilize more efficient power regulation elsewhere in the data storage device circuitry. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Prior configurations of preamplifier circuits and related control circuitry may have relied on a single power channel from a power circuit to the preamplifier. The power channel would generally provide the write voltage to the preamplifier. The preamplifier would use the write power signal to power a write driver circuit, but would need to reduce the voltage (and/or otherwise manipulate the write power signal) to create an appropriate read voltage for the read power signal. Due to area, cost, and/or complexity constraints, an on-chip linear regulator was used to reduce the read voltage in the preamplifier, resulting in wasted energy and excess heat. This configuration did have some design benefits in reducing the number of channels needed in the flex circuit and providing relative design independence between the preamplifier and the other power circuits of the control circuitry. More specifically, the power control circuits on the printed circuit board (PCB) hosting the majority of the control circuitry only needed to provide a single power signal to the preamplifier.

As areal densities have increased, the required peak write currents are relatively large. Due to constraints on the size of the line carrying the write signal through the write element of the head, this has required increasing write voltages, while read voltages have remained relatively low. This increased disparity between write and read voltages means that the amount of energy wasted (and heat generated) by on-chip linear regulators has been increasing. The use of a switching regulator, rather than a linear regulator, may represent a substantial power savings for generating the read power signal. For example, a switching regulator may operate around 80% efficiency, while a linear regulator may operate closer to 60% efficiency.

Figure 3:
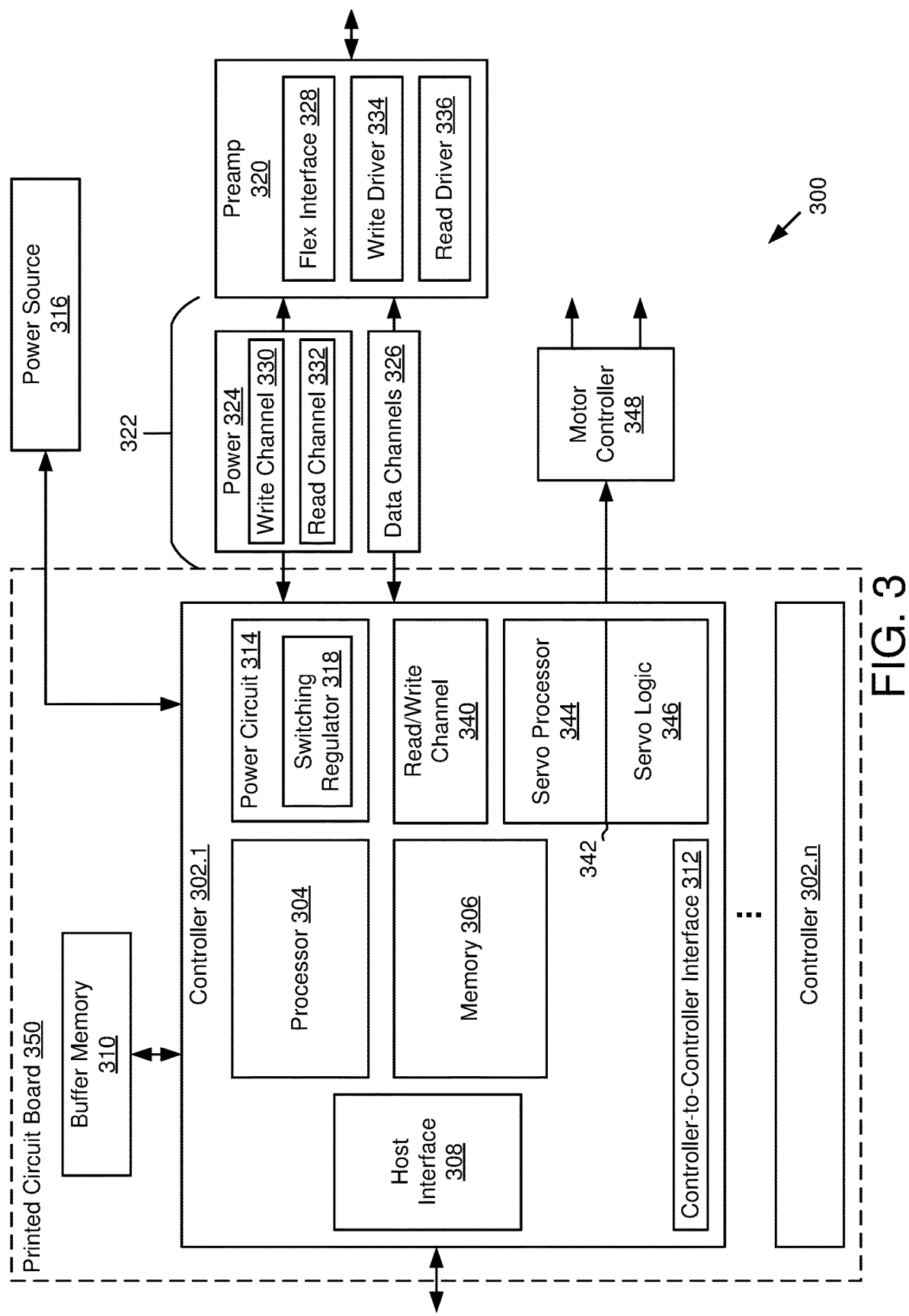
FIG. 3 is a block diagram of a configuration of data storage device electronics for read/write power channels to the preamplifier circuit.

The power circuits on the PCB may already include switching regulators for managing the power to a variety of on-board components. For example, a switching regulator may be used to generate the write power signal for the preamplifier from a source power signal, such as the PCB power signal used to power the majority of the components on the PCB. As shown in FIG. 3, configuring a switching regulator in the power circuit of a data storage device to generate both the write power signal and the read power signal, may substantially improve the power efficiency of the data storage device control circuitry.

FIG. 3 shows a portion of example control circuitry 300 for a data storage device, such as a hard disk drive (HDD). It is to be understood that the embodiments discussed herein are applicable to a data storage device such as a hard disk drive (HDD) as well as a tape drive such as a tape embedded drive (TED) or an insertable tape media drive, such as those conforming to the LTO (Linear Tape Open) standards. An example TED is described in U.S. Pat. No. 10,991,390, issued Apr. 27, 2021, titled "Tape Embedded Drive," and assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 1:
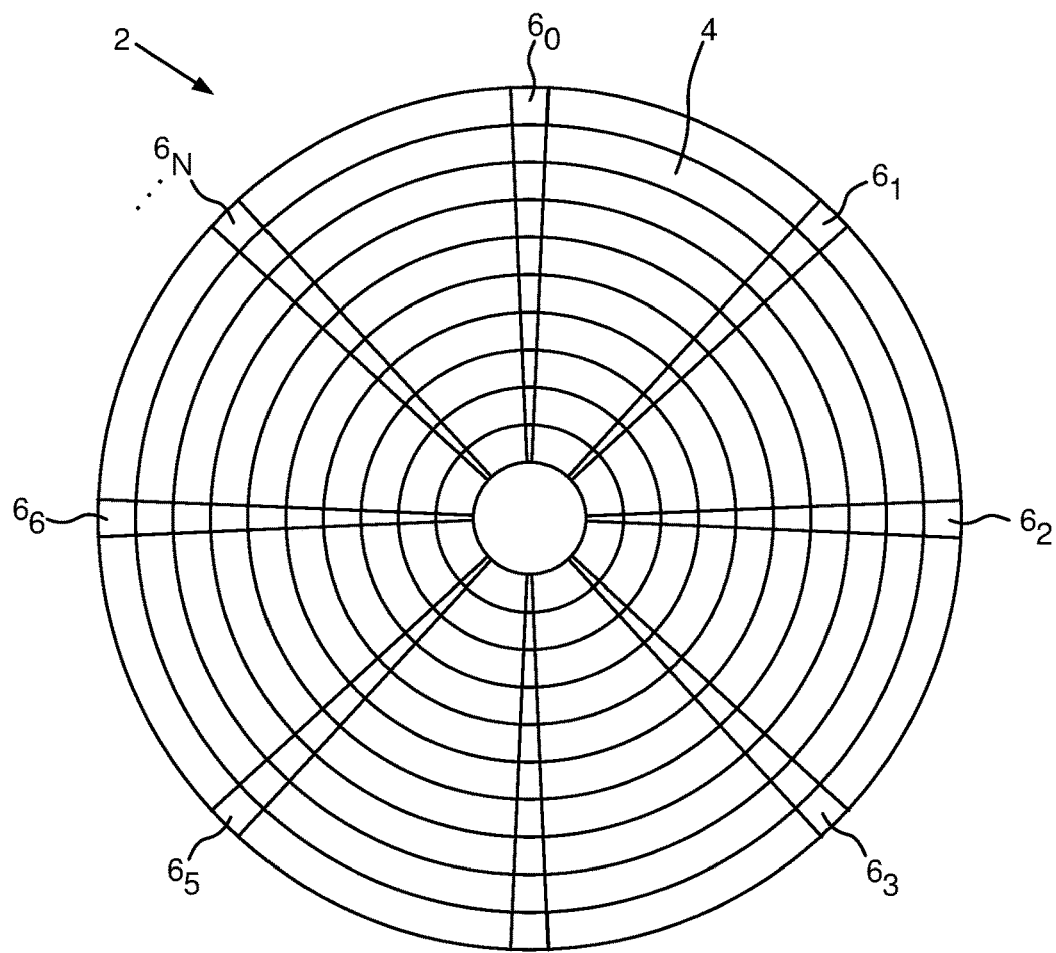
FIG. 1 is a diagram of a prior art disk format comprising a plurality of servo tracks defined by servo sectors.

In the example shown, control circuitry 300 may include one or more controllers 302.1-302.*n*. Controller 302.1 may comprise a storage device controller configured to receive host storage commands, process storage operations for writing, reading, and managing data stored to non-volatile storage media in the disk drive, such as the magnetic media disks in FIGS. 1 and 2. In some embodiments, each controller 302.1-302.*n* may correspond to a separate host interface and read/write path to a subset of disk surfaces. In some embodiments, controller 302.1 may be configured to manage servo and read/write operations for one or more actuators, heads, and corresponding writer and reader elements.

Controllers 302 may comprise a processor 304, a memory 306, a host interface 308, and access to a buffer memory 310. Controllers 302 may also comprise a controller-to-controller interface 312, a power circuit 314 electrically connected to a drive power source 316, a read/write channel 340, and a servo controller 342 including a servo processor 344 and servo logic 346. In some embodiments, one or more of host interface 308, controller-to-controller interface 312, power circuit 314, read/write channel 340, and servo controller 342 may be embodied in separate packages, such as application specific integrated circuits (ASICs), systems on a chip (SOCs), or other specialized circuits that interface with processor 304 and memory 306 for carrying out their respective functions. Controllers 302 may include physical and electrical interfaces for connecting to buffer memory 310, power source 316, preamp 320, motor controller 348, other controllers, and/or other circuitry components. In some embodiments, the components of controllers 302 may be interconnected by a bus that includes one or more conductors that permit communication among the components. For example, processor 304, memory 306, host interface 308, controller-to-controller interface 312, power circuit 314, read/write channel 340, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store firmware instructions comprising one or more modules or sub-modules for specific data storage device operations and processor 304 may execute those instructions, including controlling communication with other components, such as host interface 308, buffer memory 310, controller-to-controller interface 312, power circuit 314, read/write channel 340, and servo controller 342.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Controller-to-controller interface 312 may include a bus interface and protocols for low-level bus communication between or among components in control circuitry 300. For example, controller-to-controller interface 312 may support messaging between controller 302.1 and other controllers, such as controller 302.$n$, using inter-integrated circuit (I2C) communication protocols. Controller-to-controller interface 312 may be invoked by processor 304 for communication across controllers in configurations with multiple controllers in the same data storage device, such as some multiactuator data storage devices.

Power circuit 314 may include a plurality of electrical control circuits for managing the power signals available to various components, which may or may not operate using the same currents, voltages, and/or frequencies. For example, power circuit 314 may be configured to provide a PCB power to the various components attached to PCBA 350, motor power signals (spindle motor power, voice coil motor power, etc.) to motor controller 348, and read/write power signals to preamp 320. Power circuit 314 may receive power from a drive power source 316 that includes the source power connection of the data storage device, such as the disk drive power signal received from a host computer system or enclosure over a system power bus. In some embodiments, power circuit 314 may include one or more switching regulators 318 for converting the source power and/or previously converted power signals to other power signals used by different components. For example, switching regulator 318 may include one or more buck-boost converter circuits configured to convert source power signals into write power signals for powering the write elements of a write head and read power signals for powering the read elements of a read head.

Figure 2:
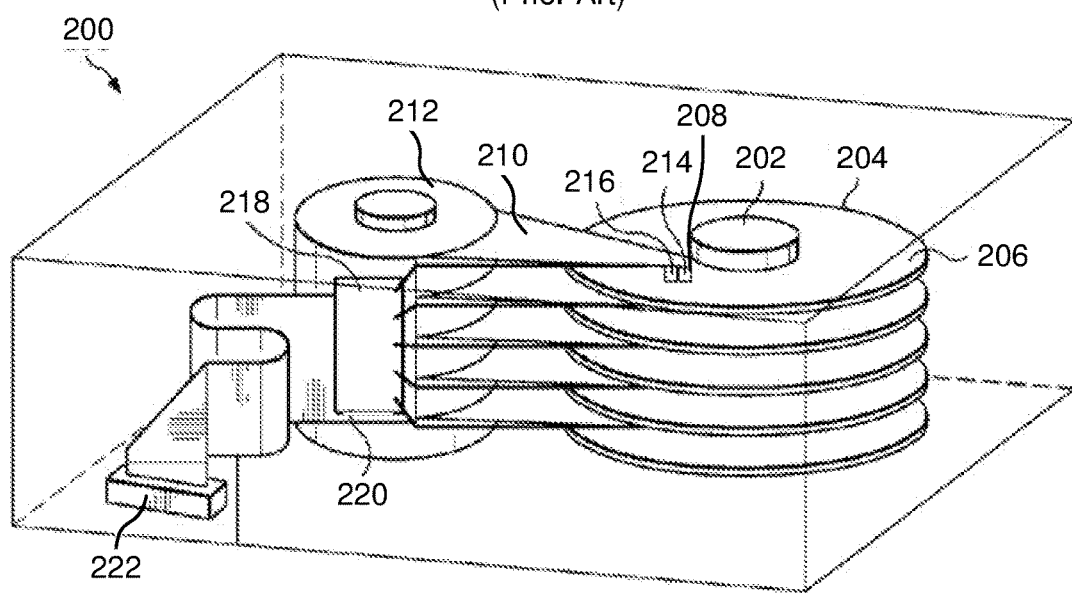
FIG. 2 is a diagram of an example data storage device in the form of a disk drive comprising a heads actuated over disk surfaces.

Power circuit 314 may provide separate read and write power signals from PCBA 350 to preamp 320. For example, the write power signal may include a write voltage that is significantly higher than a read voltage of the read power signal, such as a write voltage of 5 volts (V) compared to a read voltage of 2 volts. In some configurations, preamp 320 may be electrically connected to PCBA 350 by a specialized bus referred to as a flex circuit 322 that provides a flexible set of circuits or channels between PCBA 350 and preamp 320. As shown in FIG. 2, preamp 320 (e.g., preamplifier 218) and one end of flex circuit 322 (e.g., flex circuit 220) may be mounted to the actuator and the other end of flex circuit 322 may engage a PCBA interface connector (e.g., flex interface connector 222) for PCBA 350. Flex circuit 322 may include a plurality of power channels 324 and data channels 326. For example, each channel may correspond to sets of conductors for establishing an electrical circuit between components of PCBA 350 and preamp 320 through a flex interface 328.

Flex interface 328 may include a set of physical connections between power channels 324 and data channels 326 and a corresponding physical bus interface for receiving those connections to the circuits of preamp 320. Power channels 324 may include separate write power channel(s) 330 and read power channel(s) 332. In some configurations, a write power channel 330 may include a source write power channel and a sink write power channel connected to one or more write driver circuits 334 for powering write signals to one or more write elements of a head, and read power channel 332 may include a source read power channel and a sink write power channel connected to one or more read driver circuits 336 for powering read signals from one or more read elements of the head. Power channels 324 may also include a ground power channel. Data channels 326 may be configured to transmit analog write data signals and read data signals between read/write channel 340 and preamp 320 and may include separate read data channels and write data channels in flex circuit 322. In some configurations, each power channel and data channel may correspond to a conductive wire or line through flex circuit 322.

Read/write channel 340 may include one or more specialized circuits configured for processing binary data to be written to the disk surfaces using an analog write signal and processing the analog read signal from the disk surfaces back into binary data. For example, read/write channel 340 may include a write path comprised of various data scramblers, run-length limited (RLL) encoders, iterative error correction code (ECC) encoders, precompensation circuits, and other data or signal processing components. Read/write channel 340 may include a read path comprised of various amplifiers, filters, equalizers, analog-to-digital converters (ADCs), soft information detectors, iterative ECC decoders, and other data or signal processing components. Read/write channel 340 may provide the analog write signal to and receive the analog read signal from preamp 320, which controls and amplifies signals to and from the heads.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. In some embodiments, servo controller 342 may include servo processor 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo signals read from the disk surface using preamp 320 and provided to servo controller 342 through data channels 326. Servo controller 342 may provide servo control signals to motor controller 348 and motor controller 348 may control one or more actuator VCMs and/or a spindle motor for rotating the disk stack.

Figure 4:
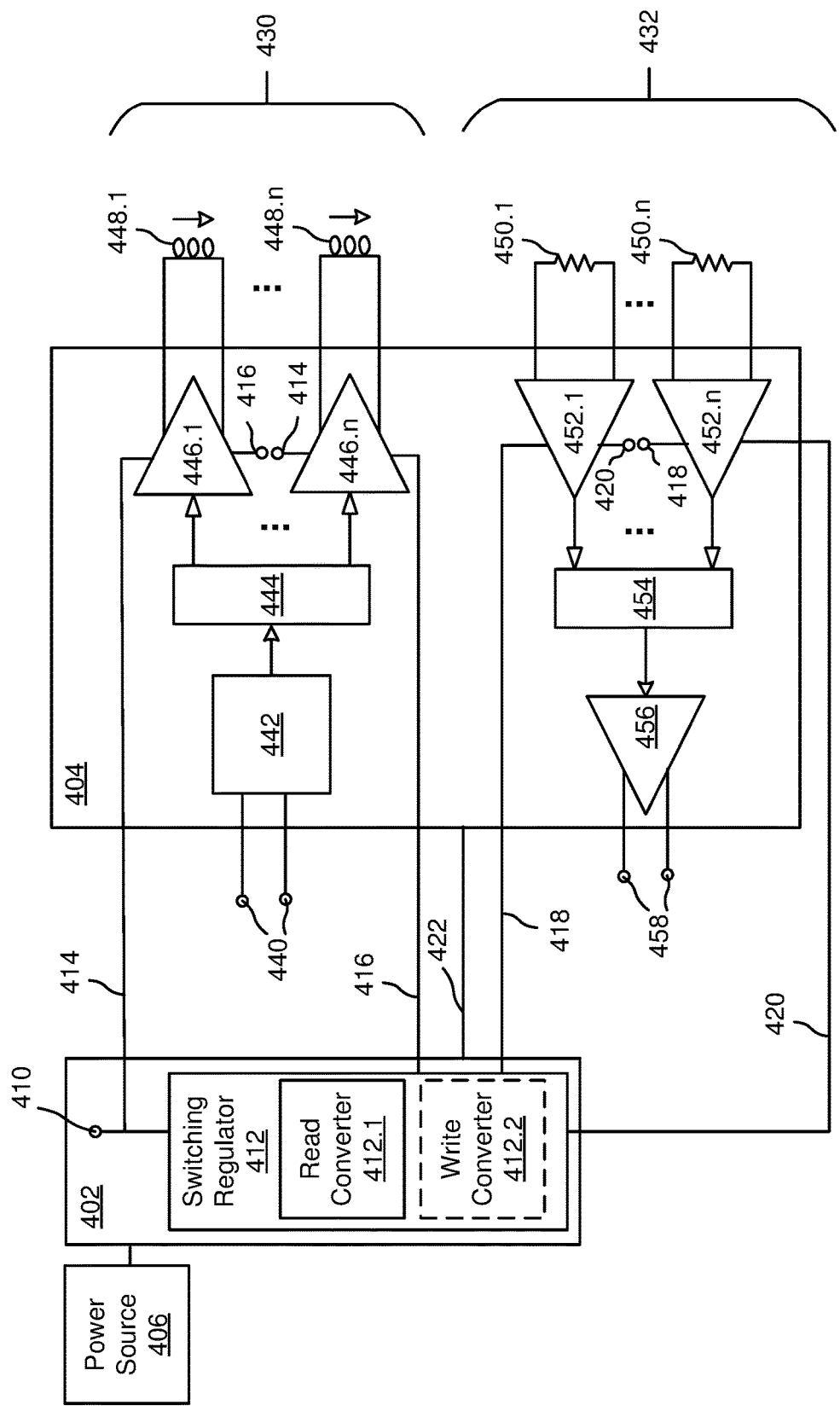
FIG. 4 is a block/circuit diagram of an example preamplifier circuit and corresponding power channels from other drive electronics.

FIG. 4 shows power circuits 400 for driving read and write signals from a PCB 402 through a preamplifier circuit 404 to writer elements 448 and reader elements 450. PCB 402 may include a printed circuit board assembly configured similarly to PCBA 350 in FIG. 3. PCB 402 may receive a source power signal from a power source 406, such as the storage device power source and/or a power circuit that converted the storage device power to a PCB power. Electrical circuits established between PCB 402 and preamplifier circuit 404 are simplified in FIG. 4 and one or more connection may include electrical channels through a flex circuit or other electrical bus structure between the components, as described above with regard to FIG. 3.

PCB 402 may include a switching regulator 412. In some embodiments, switching regulator 412 may be a portion of a power circuit used to regulate power to various control circuit components of the data storage device. For example, switching regulator 412 may include one or more power converters, switches, and/or related power control logic to enable a source or input power signal 410 from a voltage source to be converted into one or more other power signals having different voltages and other signal characteristics, such as write power signal 414, 416 and read power signal 418, 420. Switching regulator 412 may include a switching regulator or set of switching regulators attached to PCB 402 and providing different voltages to different PCB components. Source power signal 410 may be the external power signal received by the data storage device or may have been previously converted by another component in the power circuit to another power signal (and corresponding voltage), such as the PCB power signal for the PCB voltage that is the baseline voltage of components in or attached to PCB 402. PCB 402 may also provide a ground power channel 422 for preamplifier circuit 404. For example, a flex circuit connection between PCB 402 and preamplifier circuit 404 may include a ground connection between the two circuits.

Switching regulator 412 may be configured to provide write power signal 414, 416 to write driver circuit 430 and read power signal 418, 420 to read driver circuit 432. In some embodiments, switching regulator 412 may support any number of write driver circuits and read driver circuits corresponding to various head, writer element, and reader element configurations. Switching regulator 412 may be configured to selectively provide write power signal 414, 416 to write driver circuit 430 for write operations and read power signal 418, 420 to read driver circuit 432 for read operations. For example, switching regulator 412 may include or interface with a switch and power control logic that enables switching regulator 412 to switch between providing write power signal 414, 416 to write driver circuit 430 during a first operating time and read power signal 418, 420 to read driver circuit 432 during a second operating time, based on the same source power signal 410.

In some configurations, source power signal 410 may be configured to be equivalent to the write power signal. That is, switching regulator 412 may receive the write power signal as an input signal and use the write power signal to provide both write power signal 414, 416 to write driver circuit 430 and read power signal 418, 420 to read driver circuit 432. Switching regulator 412 may include a read converter circuit 412.1 configured to convert source power signal 410 to read power signal 418, 420 with a different read voltage than source power signal 410 and write power signal 414, 416. For example, the write power signal and corresponding write voltage may be the source power signal and read converter 412.1 may be a buck-boost converter that reduces the write voltage to the read voltage. In some embodiments, write power signal 414, 416 may be an asymmetric power signal having positive and negative legs with different absolute voltage values, such as 5V source write voltage to write driver circuit 430 and −3V sink write voltage from write driver circuit 430. Read converter 412.1 may be further configured to adjust the symmetry of source power signal 410 to provide a symmetrical power signal, where the absolute voltage values of the positive and negative legs are equal, to read driver circuit 432, such as 2V source read voltage to read driver circuit 432 and −2V sink write voltage from read driver circuit 432. Read converter circuit 412.1 may generate a source read power signal 418 and receive a sink read power signal 420 and read driver circuit 432 may provide those signals to any number of reader elements 450.1-450.$n$ through a single set of source and sink power lines for read power. In an alternate embodiment including a plurality of read driver circuits, each read driver circuit may receive source read power signal 418 and return sink read power signal 420 through the same power channels.

In an alternate embodiment, switching regulator 412 may receive a source power signal that is not equivalent to write power signal 414, 416 and switching regulator 412 may further include a write converter circuit 412.2 configured to convert the source power signal to the write power signal. For example, the source power signal may be a PCB power signal with a PCB voltage that is different than the write voltage. Write converter 412.2 may be configured to receive the source power signal and convert the source voltage to the different write voltage, such as using a second buck-boost converter. In some configurations, write converter 412.2 may be further configured to produce an asymmetrical write power signal, regardless of the symmetry or asymmetry of the source power signal. Switching regulator 412 may generate a source write power signal 414 and receive a sink write power signal 416 and write driver circuit 430 may provide a plurality of corresponding source write power signals 414 and sink write power signals 416-416 to any number of writer elements 448.1-448.$n$ through a single set of source and sink power lines for write power. In an alternate embodiment including a plurality of write driver circuits, each write driver circuit may receive source write power signal 414 and return sink write power signal 416 through the same power channels.

In addition to write power signal 414, 416, write driver circuit 430 may receive one or more write data signals 440 from a read/write channel of the data storage device. For example, write driver circuit 430 may include a plurality of bus interface channels, such as a write power interfaces (source and sink) and write data interfaces (source and sink). Write data signal 440 may include an analog data signal corresponding to data bits to be written to the magnetic storage medium of the data storage device by write elements 448. Write data signal 440 may be received by write data receiver 442. Write data signal 440 may be received with a write data voltage that is less than the write voltage needed to write the data bits to the magnetic storage medium. In some embodiments, write data signal 440 may include a write data signal with write data patterns for multiple writer elements 448.1-448.$n$. Write data receiver 442 may forward write data signal 440 to a write multiplexer circuit 444. Write multiplexer circuit 444 may be configured to separate the write data patterns for different writer elements into separate component write data streams. The corresponding component write data signals may be directed to write driver amplifiers 446.1-446.$n$ corresponding to each writer element 448.1-448.$n$ in communication with write driver circuit 430. In some configurations, write data signal 440 may contain only a single data stream and write driver circuit 430 may include only a single write driver amplifier 446 to receive the write data signal and write power signal to drive the write signal to a single writer element 448. Write driver amplifiers 446 may receive write data signals, such as component write data signals, and write power signals, such as write power signal 414, 416. Write driver amplifiers 446 may amplify the write data signals using the write power signals. For example, the resulting write signal to each writer element may include the same data pattern as the write data signal, but at different (higher) voltage levels. Write power signal 414, 416 may include a write source voltage for write source power signal 414 and a write sink voltage for write sink power signal 416 and they may be asymmetric voltages.

In addition to receiving read power signal 418, 420, read driver circuit 432 may return a read data signal 458. For example, read driver circuit 432 may include a plurality of bus interface channels, such as a read power interfaces (source and sink) and read data interfaces (source and sink).

Read data signal 458 may include an analog data signal corresponding to data bits read from the magnetic storage medium of the data storage device by reader elements 450. Read driver circuit 432 may include at least one read signal circuit 452 configured to apply a read voltage in a baseline read signal to reader elements 450 and receive the return read data signal based on the interactions between the reader elements 450 and the magnetic transitions in the magnetic storage medium passing the reader elements. For example, read signal circuit 452 may receive read power signal 418, 420, apply it to a reader element 450 to receive a corresponding read signal back from reader element 450, and output the read signal as a read data signal for further processing. Read signal circuit 452 may receive a source read power signal 418 with a read source voltage and return a read sink power signal 420 with a read sink voltage. The read source voltage and the read sink voltage may be configured to be symmetrical. In some configurations, read driver circuit 432 may include a plurality of read signal circuits 452.1-452.n corresponding to and communicating with a plurality of reader elements 450.1-450.n. Each reader element 450.1-450.n and corresponding read signal circuit 452.1-452.n may generate a different read data pattern and corresponding component read data signal. Read driver circuit 432 may include a read multiplexer circuit 454 to receive the plurality of component read data signals and combine them into a combined read data signal to be returned to the read/write channel. Read multiplexer 454 and/or read signal circuit 452 may send the combined read data signal or, in a configuration without multiplexer 454, the read data signal from a single reader element to a read driver amplifier 456. Read driver amplifier 456 may return read data signal 458 to the read/write channel, such as through the flex circuit to a read channel on PCB 402.

Figure 5:
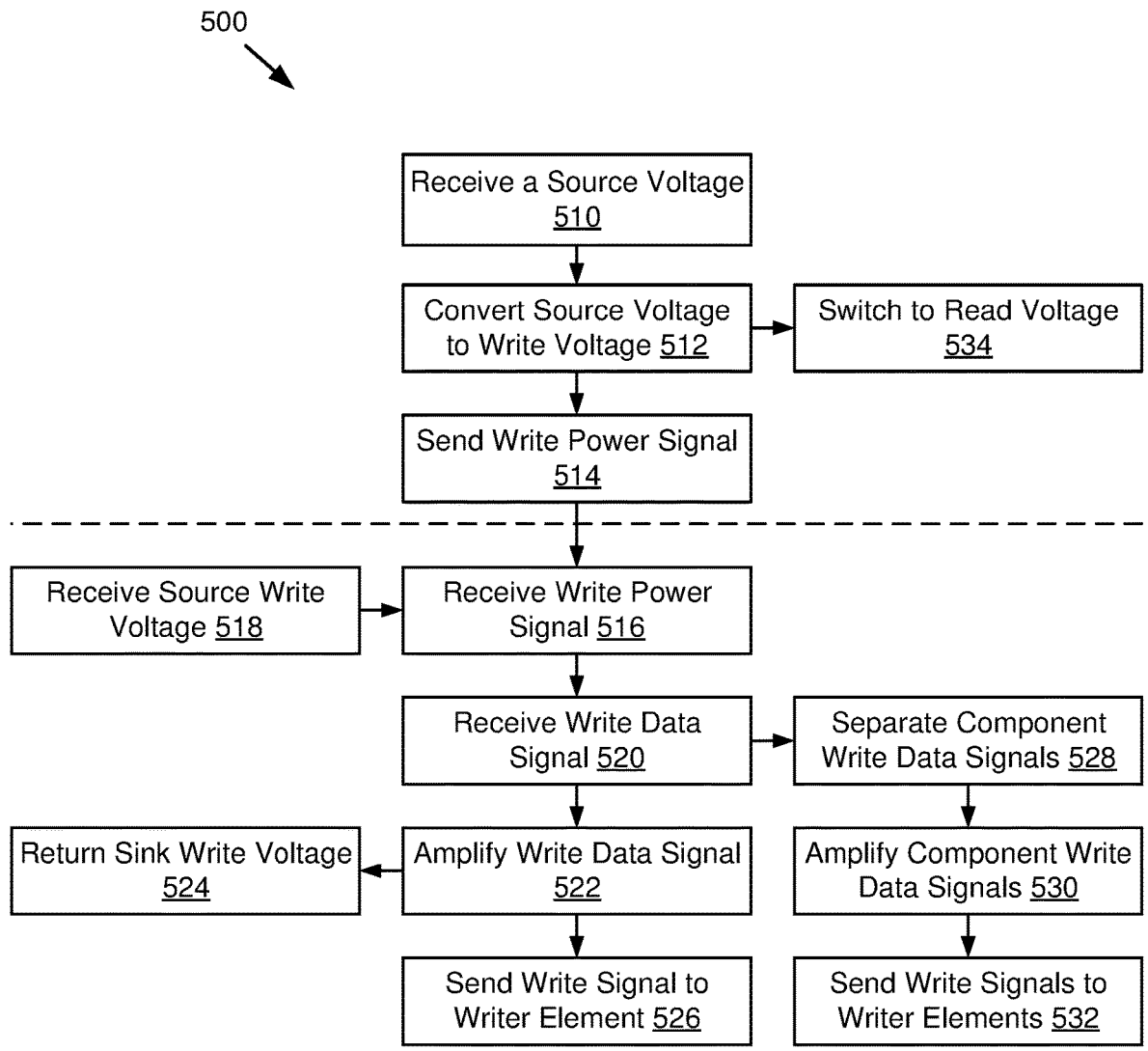
FIG. 5 is an example method of providing write power to a preamplifier circuit for write operations.

As shown in FIG. 5, control circuitry 300 and/or power circuits 400 may be operated according to an example method of providing a write signal to one or more write elements of one or more heads in a data storage device, i.e., according to the method 500 illustrated by blocks 510-534. In some configurations, blocks 510-514 and 534 may be executed by a switching controller on a disk drive controller PCB and blocks 516-532 may be executed by a preamplifier circuit in communication with the PCB via a flex circuit or similar electrical signal bus.

At block 510, a source voltage may be received. For example, a switching controller may receive a source voltage from a PCB power source.

At block 512, the source voltage may be converted to a write voltage. For example, the switching controller may convert the source power signal from the PCB power source to a write power signal with the desired write voltage. In some configurations, block 512 may be omitted because the source voltage received by the switching controller is already configured as the write voltage.

At block 514, the write power signal may be sent to the preamplifier circuit. For example, the switching controller may direct the write power signal through a write power channel of a bus connection to the preamplifier circuit, such as flex circuit from the PCB to the actuator assembly of the data storage device.

At block 516, the write power signal may be received by the preamplifier circuit. For example, the write power signal from the switching controller may be received through a bus interface of the preamplifier circuit to a write driver circuit.

At block 518, the received signal may include a source write power signal. For example, the write power signal may include a source write power signal received by a source input of the write driver circuit from a source power channel in the connecting bus circuit dedicated to providing the write voltage.

At block 520, a write data signal may be received. For example, the preamplifier circuit may receive a write data signal from the read/write channel of the data storage device over a separate channel of the bus connection to the PCB.

At block 522, the write data signal may be amplified. For example, the write driver circuit may use the write power signal to amplify the write data signal to the configured write voltage.

At block 524, a sink write power signal may include a sink write power signal. For example, the write power signal may include a sink write power signal sent from the sink output of the write driver circuit to a sink power channel in the connecting bus circuit dedicated to returning the write power signal to the power circuit on the PCB.

At block 526, the write signal may be sent to the writer element of a head. For example, the write driver circuit may send the write data signal amplified at block 522 to the writer element for writing data to the magnetic storage medium of the data storage device.

In some configurations, a write driver circuit may support more than one writer element and/or write head and method 500 may include blocks 528-532. The write data signal received at block 520 may include multiple data patterns for different writer elements. At block 528, the write data signal may be separated into component write data signals. At block 530, each component write data signal may be amplified, such as by separate write driver amplifiers corresponding to each writer element. At block 532, the component write signals may be sent to each writer element.

At block 534, the write voltage may be switched to the read voltage. For example, the same switching regulator may support method 500 and method 600, described below. Following an operating period for write operations, the switching regulator may switch from providing the write voltage power signal for write operations to providing the read voltage power signal for read operations.

Figure 6:
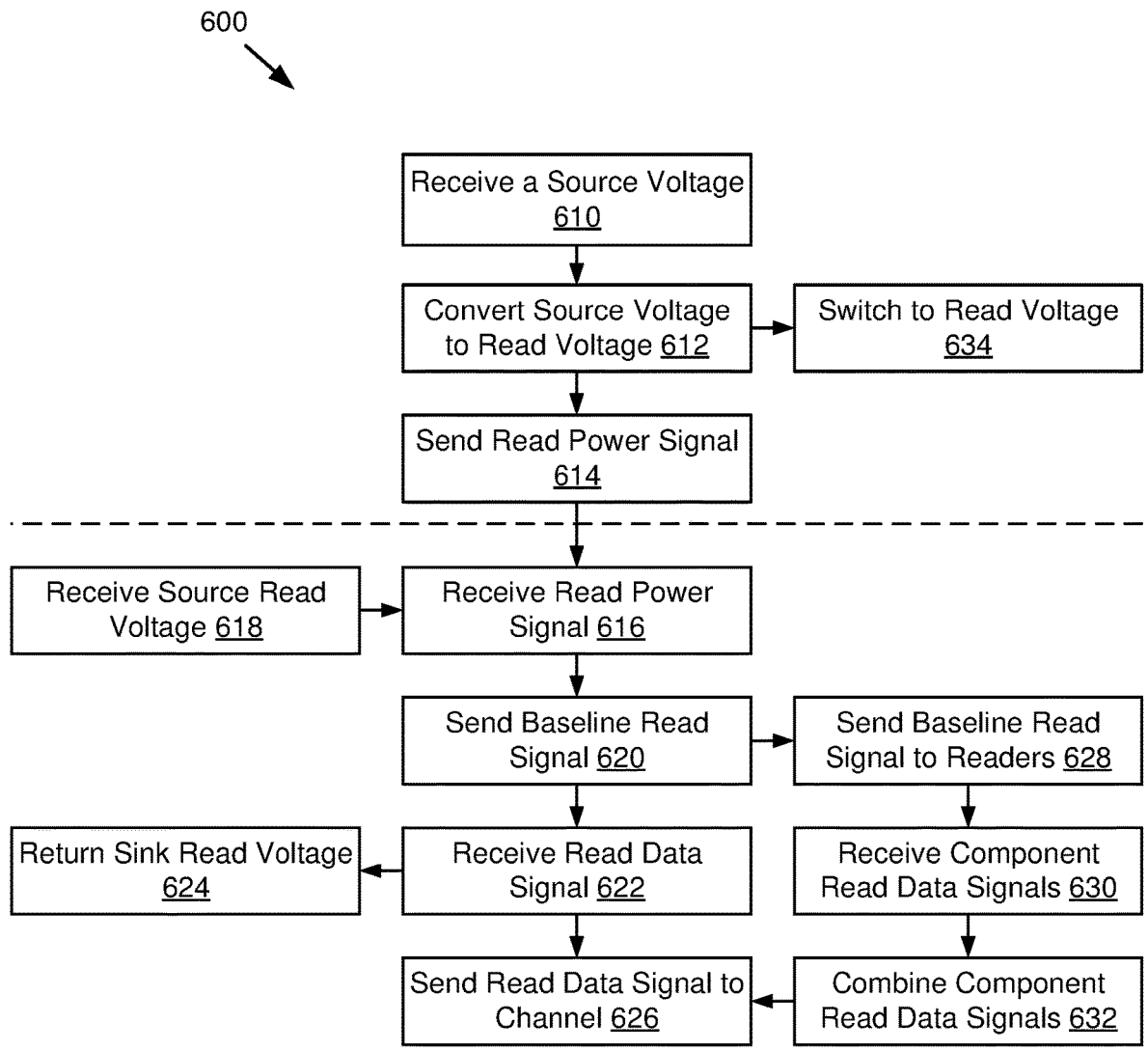
FIG. 6 is an example method of providing read power to a preamplifier circuit for read operations.

As shown in FIG. 6, control circuitry 300 and/or power circuits 400 may be operated according to an example method of generating a read signal from one or more reader elements of one or more heads in a data storage device, i.e., according to the method 600 illustrated by blocks 610-634. In some configurations, blocks 610-614 and 634 may be executed by a switching controller on a disk drive controller PCB and blocks 616-632 may be executed by a preamplifier circuit in communication with the PCB via a flex circuit or similar electrical signal bus.

At block 610, a source voltage may be received. For example, a switching controller may receive a source voltage from a PCB power source. In some configurations, the source voltage may be equal to a write voltage used in method 500.

At block 612, the source voltage may be converted to a read voltage. For example, the switching controller may convert the source power signal from the PCB power source to a read power signal with the desired read voltage.

At block 614, the read power signal may be sent to the preamplifier circuit. For example, the switching controller may direct the read power signal through a read power channel of a bus connection to the preamplifier circuit, such as flex circuit from the PCB to the actuator assembly of the data storage device.

At block 616, the read power signal may be received by the preamplifier circuit. For example, the read power signal from the switching controller may be received through a bus interface of the preamplifier circuit to a read driver circuit.

At block 618, the received signal may include a source read power signal. For example, the read power signal may include a source read power signal received by a source input of the read driver circuit from a source power channel in the connecting bus circuit dedicated to providing the read voltage.

At block 620, a baseline read signal may be sent to a read element of the data storage device. For example, the preamplifier circuit may send a baseline signal based on the read power signal received at block 618 to one or more reader elements in one or more heads.

At block 622, a read data signal may be received from the reader element. For example, the read driver circuit may use receive a read data signal based on the interactions between the baseline signal and the flux from the magnetic storage medium in the reader element.

At block 624, a return read power signal may include a sink read power signal. For example, the read power signal may include a sink read power signal sent from the sink output of the read driver circuit to a sink power channel in the connecting bus circuit dedicated to returning the read power signal to the power circuit on the PCB.

At block 626, the read data signal may be sent to the read/write channel of the data storage device. For example, the read driver circuit may send the read data signal received from the reader element at block 622, with or without further processing, to the read channel on the PCB of the data storage device.

In some configurations, a read driver circuit may support more than one reader element and/or read head and method 600 may include blocks 628-632. The baseline read signal sent at block 620 may include baseline signals for different reader elements. At block 628, the read baseline signal may be sent to each reader element. At block 630, component read data signals may be received from each reader element, such as by separate read signal circuits corresponding to each reader element. At block 632, the component read signals may be combined into a multiplexed read data signal and sent to the read channel at block 626.

At block 634, the read voltage may be switched to the write voltage. For example, the same switching regulator may support method 500 and method 600. Following an operating period for read operations, the switching regulator may switch from providing the read voltage power signal for read operations to providing the write voltage power signal for write operations.

Technology for improved data protection in multiple actuator data storage devices using monitoring of coupling states across actuators during concurrent operations is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A preamplifier circuit, comprising:
    at least one write driver circuit configured to send a write signal to at least one head of a data storage device, wherein the at least one write driver circuit comprises:
        a write data receiver configured to receive a write data signal from a read/write channel of the data storage device; and
        at least one write driver amplifier configured to amplify the write data signal using a write power signal;
    at least one read driver circuit configured to receive a read signal from the at least one head of the data storage device, wherein the at least one read driver circuit comprises:
        a read signal circuit configured to send, using a read power signal, a baseline signal to the at least one head and receive the read signal from the at least one head; and
        a read driver amplifier configured to send the read signal to the read/write channel; and
    a bus interface comprising:
        a write power interface configured to receive the write power signal for the at least one write driver circuit; and
        a read power interface configured to receive the read power signal for the at least one read driver circuit, wherein a write voltage of the write power signal is different than a read voltage of the read power signal.

2. The preamplifier circuit of claim 1, wherein:
    the bus interface is configured to electrically connect to a flex circuit comprising:
        at least one write power channel; and
        at least one read power channel; and
    the at least one write power channel is different than the at least one read power channel.

3. The preamplifier circuit of claim 1, wherein:
    the at least one head includes a plurality of writer elements; and
    the at least one write driver circuit further comprises:
        a plurality of write driver amplifiers corresponding to the plurality of writer elements and configured to receive the write power signal; and
        a write multiplexer configured to:
            separate the write data signal into a plurality of component write data signals corresponding to the plurality of writer elements; and
            send the component write data signals to the plurality of write driver amplifiers.

4. The preamplifier circuit of claim 1, wherein:
    the at least one head includes a plurality of reader elements; and
    the at least one read driver circuit further comprises:
        a plurality of read signal circuits corresponding to the plurality of reader elements and configured to receive the read power signal; and
        a read multiplexer configured to combine a plurality of component read signals corresponding to the plurality of reader elements into the read signal sent to the read driver amplifier.

5. The preamplifier circuit of claim 1, wherein:
    the at least one write driver amplifier is further configured to:
        receive a source write voltage for the write power signal; and
        return a sink write voltage for the write power signal; and
    the source write voltage and the sink write voltage are asymmetrical.

6. The preamplifier circuit of claim 1, wherein:
    the read signal circuit is further configured to:
        receive a source read voltage for the read power signal; and
        return a sink read voltage for the read power signal; and
    the source read voltage and the sink read voltage are symmetrical.

7. The preamplifier circuit of claim 1, wherein the bus interface further comprises:

at least one write data interface configured to receive at least one write data signal from the read/write channel; and at least one read data interface configured to return at least one read signal to the read/write channel.

8. The preamplifier circuit of claim 1, wherein:
the bus interface electrically connects:
the at least one write driver circuit to a first voltage source on a power circuit of the data storage device; and
the at least one read driver circuit to a second voltage source on the power circuit of the data storage device; and
the second voltage source is a switching regulator of the power circuit.

9. The preamplifier circuit of claim 8, wherein:
the first voltage source is a first converter of the switching regulator;
the second voltage source is a second converter of the switching regulator;
the switching regulator receives a source voltage from a power source of the data storage device; and
the power circuit is connected to a printed circuit board comprising a read/write channel for the data storage device.

10. A data storage device comprising the preamplifier circuit of claim 1.

11. A method comprising:
receiving, by a preamplifier circuit and from a power circuit, a write power signal for a write driver circuit in the preamplifier circuit;
receiving, by the write driver circuit, a write data signal from a read/write channel of a data storage device;
amplifying, by the write driver circuit, the write data signal using the write power signal;
receiving, by the preamplifier circuit and from the power circuit, a read power signal for a read driver circuit in the preamplifier circuit, wherein a write voltage of the write power signal is different than a read voltage of the read power signal;
sending, from the write driver circuit and using the write power signal, a write signal to at least one writer element of the data storage device;
sending, by the read driver circuit and using the read power signal, a baseline signal to at least one reader element;
receiving, by the read driver circuit and using the read power signal, a read signal from at least one reader element of the data storage device, wherein the read signal from the at least one reader element is responsive to the baseline signal; and
sending, by the read driver circuit, the read signal to a read/write channel of the data storage device.

12. The method of claim 11, further comprising:
receiving, at a switching regulator electrically connected to the preamplifier circuit, a source power signal having a source voltage; and
converting, by the switching regulator, the source power signal to the write power signal, wherein the source voltage is different than the write voltage.

13. The method of claim 11, further comprising:
separating, by the write driver circuit, the write data signal into a plurality of component write data signals corresponding to a plurality of writer elements; and
amplifying, by the write driver circuit, the plurality of component write data signals using the write power signal.

14. The method of claim 11, further comprising:
sending, by the read driver circuit, a plurality of baseline signals based on the read power signal to a plurality of reader elements;
receiving, by the read driver circuit, a plurality of component read signals corresponding to the plurality of reader elements; and
combining, by the read driver circuit, the plurality of component read signals into the read signal sent to the read/write channel.

15. The method of claim 11, further comprising:
receiving, by the write driver circuit, a source write voltage for the write power signal; and
returning, by the write driver circuit, a sink write voltage for the write power signal, wherein the source write voltage and the sink write voltage are asymmetrical.

16. The method of claim 11, further comprising:
receiving, by the read driver circuit, a source read voltage for the read power signal; and
returning, by the read driver circuit, a sink read voltage for the read power signal, wherein the source read voltage and the sink read voltage are symmetrical.

17. The method of claim 11, wherein the preamplifier circuit:
receives, through a bus interface of the preamplifier circuit:
the write power signal from a first voltage source;
the write data signal; and
the read power signal from a second voltage source; and
returns, through the bus interface, the read signal to the read/write channel.

18. The method of claim 11, further comprising:
receiving, at a switching regulator electrically connected to the preamplifier circuit, a source power signal having a source voltage; and
converting, by the switching regulator, the source power signal to the read power signal, wherein the source voltage is different than the read voltage.

19. The method of claim 18, further comprising:
switching, by the switching regulator, between:
sending the write power signal to the write driver circuit; and
sending the read power signal to the read driver circuit.

20. A data storage device comprising:
a non-volatile storage medium;
a read/write channel circuit;
a preamplifier circuit comprising:
a write driver circuit configured to send a write signal to a writer element for the non-volatile storage medium;
a read driver circuit configured to receive a read signal from a reader element for the non-volatile storage medium;
means for receiving a write power signal for the write driver circuit;
means for receiving a write data signal from a read/write channel of the data storage device;
means for amplifying the write data signal using the write power signal;
means for sending, using a read power signal, a baseline signal to the reader element, wherein a write voltage of the write power signal is different than a read voltage of the read power signal; and
means for receiving a read power signal for the read driver circuit, wherein the read signal from the reader element is responsive to the baseline signal; and means for converting a source power signal to the read power signal, wherein a source voltage of the source power signal is different than the read voltage of the read power signal.

\* \* \* \* \*